ciated, which comprises contacting a mixture of a fish liver oil and a vegetable oil containing natural antioxidants with a solvent selected from the group consisting of isopropyl alcohol, n-propyl alcohol, acetone, diacetone alcohol, ethyl acetate, methyl acetate, and methyl ethyl ketone, said solvents containing at least ten percent of water, and separating a solution containing a highly active antioxidant extract from the remainder of the oil mixture, said antioxidant extract having an iodine value lower than that of the original oil mixture.

LORAN O. BUXTON.

Patented Mar. 19, 1946

2,396,680

UNITED STATES PATENT OFFICE 2,396,680

NATURAL ANTIOXIDANTS

Loran O. Buxton, Belleville, N. J., assignor to National Oil Products Company, Harrison, N. J., a corporation of New Jersey No Drawing. Application February 20, 1942, Serial No. 431,700

6 Claims. (Cl. 252—398)

This invention relates to the production of antioxidants and to the stabilization of oxidizable organic substances, primarily those of an oily or fatty nature.

It is well known in the art that many oxidizable organic substances, e. g. oils, fats and waxes containing fatty acid radicals, as well as soaps thereof, tend to be detrimentally affected by exposure to atmospheric conditions for prolonged periods of time. For example, many oils and fats tend to develop considerable rancidity and undesirable tastes and odors upon prolonged exposure to air. This instability of oils and fats tends to be accentuated by conventional refining processes since in many cases the refining treatment destroys or removes the natural antioxidants contained in such substances. This characteristic instability is particularly undesirable in connection with fat-soluble vitamin-containing oils, since these oils not only show the typical tendency to become rancid upon exposure to air, but also tend to lose a considerable portion of their valuable vitamin activity. Other oxidizable organic substances manifest their characteristic instabilities in different fashions, but in practically every case their instability is highly undesirable.

As a result of the instability shown by many oxidizable organic substances, many attempts have been made to increase the resistance of these substances to the action of oxidizing influences. For example, it has been proposed to stabilize oils and fats by adding certain crude vegetable oils thereto, the theory being that since the crude vegetable oils suggested for use contain natural antioxidants, these antioxidants would serve to stabilize the oils and fats. This proposal has, however, not met with any particular success because of the fact that since the vegetable oils do not contain very high percentages of the antioxidants, disproportionately large amounts of the oils have to be added to the substances to be stabilized in order to achieve the desired antioxidant effect. Several proposals have been advanced designed to recover valuable fractions from vegetable oils, but there has been no important success achieved along these lines with regard to the production of effective antioxidants therefrom; as a matter of fact, the art has generally believed that the vegetable meals, not the oils expressed therefrom, were the most suitable source of antioxidants and has turned away from the idea of recovering antioxidants from such oils.

It has been suggested that solvents, such as ethyl alcohol, would be capable of extracting effective antioxidants from oil-free vegetable meals. This proposal has several disadvantages. In the first place, the antioxidants extracted from the meals are generally not completely oil-soluble, so that in some cases it is not possible to form completely homogeneous mixtures of these antioxidants with substances such as oils and fats. In the second place, the antioxidants extracted from vegetable meals may have extremely dark colors and unpleasant odors and are generally obtained in very poor yields. The result of these disadvantages has been that the suggested method has not met with any substantial degree of commercial success.

It has also been proposed to recover antioxidants from vegetable oils by saponifying the oils, separating the unsaponifiable portions of the oils and recovering antioxidants from these unsaponifiable portions by successive extractions and fractionations. This proposal has likewise been commercially unsuccessful because it entails the destruction by saponification of the valuable vegetable oils, thereby rendering the process highly uneconomical, and because the saponification destroys the antioxidant properties of certain of the materials contained in the oils; moreover, the necessity for carrying out a number of extraction and fractionation steps is clearly disadvantageous.

Because of the many disadvantages inherent in prior processes for the production of antioxidants, there is still a considerable demand in the industry for a simple, economical and effective method for preparing antioxidants which will accomplish the desired results. Furthermore, because of the tremendous recent development in the production and use of fat-soluble vitamin-containing oils, the need for such antioxidants has become particularly acute due to the well known instability of vitamins contained in such oils.

It is an object of this invention to provide a simple and economical process for the production of highly effective antioxidants.

A specific object of this invention is to provide naturally occurring antioxidants capable of stabilizing fat-soluble vitamin-containing oils.

Other objects of the invention will in part be obvious and will in part appear hereinafter.

I have discovered that highly active antioxidant compositions may be prepared from fatty materials containing natural antioxidants by treating such materials with highly polar solvents which are substantially immiscible with the fatty materials at room temperature or at temperatures above room temperature. I have found, contrary to all expectations, that although the fatty materials themselves are immiscible with the polar solvents at room temperature or above, the natural antioxidants contained therein, or a substantial portion thereof, are soluble in the solvents. My discovery thus provides a simple, effective means of preparing highly potent natural antioxidant concentrates, since merely by extracting a natural antioxidant-containing fatty material at about room temperature (i. e. about 18° C. to 30° C.) with a highly polar solvent immiscible therewith, the natural antioxidants contained in the fatty material become concentrated in the solvent. The fatty material and the solvent are readily separated, e. g. by decantation, centrifugation, etc., and the natural antioxidants easily recovered from the solvent, e. g. by vacuum distillation of the solvent, leaving as a residue a very active antioxidant fraction. My discovery is particularly applicable to the recovery of antioxidants from fatty oils such as vegetable and fish oils, since the solvent extraction of such materials with highly polar solvents immiscible therewith yields products containing antioxidants in extremely active condition. I have further found that the extracts recovered from fatty materials may be blended with oxidizable organic substances to form mixtures extremely resistant to deteriorative oxidation. This invention is primarily concerned with the stabilization of oxidizable organic substances of an oily or fatty nature, since my antioxidants may be easily blended with such substances to form completely homogeneous, stable mixtures. A preferred embodiment of my invention involves the stabilization of fat-soluble vitamin-containing oils, since the addition of my extracts to such oils not only prevents the development of undesirable rancidity and discoloration, but also stabilizes the vitamin content of the oils so that there is relatively little destruction of either the vitamin A or vitamin D contained in the oils even after prolonged exposure to atmospheric conditions. My novel process has the additional advantage that the residual fatty materials from which the antioxidants have been extracted are more valuable than the fatty materials originally treated, since a certain amount of refining takes place due to a substantial removal of color and odor along with constituents responsible for the production of "break"; thus my invention not only yields valuable antioxidants, but also produces refined fatty materials suitable for a wide variety of purposes. The yields obtained in accordance with my process are excellent and the solvents employed are all readily available and comparatively inexpensive; as a result, this novel process for the preparation of antioxidants is extremely economical.

The term "polar solvent" is employed herein to connote an organic solvent containing a polar functional grouping, i. e. a functional grouping which tends to produce an unbalanced electronic structure and thereby activate the molecule and impart a characteristic dipole moment thereto; examples of such polar functional groupings are the hydroxyl group, the carbonyl group, and the ester grouping.

The fatty materials from which the antioxidants are extracted in accordance with this invention may be any fatty materials containing naturally-occurring antioxidants, or mixtures of such fatty materials; preferably crude oils containing such antioxidants are employed. The term "fatty material" is used throughout the specification and claims to include oils, fats and waxes containing fatty acid radicals. There are many such materials containing natural antioxidants known to the art. Thus, vegetable oils and fats, such as soybean oil, wheat germ oil, corn germ oil, corn oil, oat oil, wheat bran oil, rye oil, olive oil, sesame oil, cottonseed oil, palm oil, cocoa butter, palm kernel oil, coconut oil, rice bran oil, rice germ oil, linseed oil, oiticica oil, teaseed oil, perilla oil, alfalfa seed oil, celery seed oil, flax seed oil, hemp seed oil, kapok oil, mustard seed oil, rape seed oil, poppy seed oil, sunflower seed oil, pumpkin seed oil, melon seed oil, peanut oil and the like may be treated. Another group of fatty materials which may be employed are the fish liver oils, such as cod liver oil, tuna liver oil, halibut liver oil, shark liver oil, etc., as well as other marine oils, such as menhaden oil, herring oil and sardine oil. Other oils which may be treated in accordance with the present invention are tomato seed oil, grape seed oil, peach kernel oil, egg oil and whale oil. I prefer to produce my antioxidants from vegetable oils, and in the detailed description hereinafter given particular reference will be made to the treatment of such oils; however, it is to be understood that other fatty materials may be used if desired.

Solvents which may be used in carrying out the process of the invention include isopropyl alcohol, n-propyl alcohol, acetone, diacetone alcohol, ethyl acetate, methyl acetate, and methyl ethyl ketone, said solvents containing at least 10% of water. The natural antioxidants which it is desired to extract from the fatty materials are soluble in these solvents at room temperature, whereas the fatty materials themselves are immiscible therewith or relatively so. While these solvents have proved to be very successful in the practice of this invention it is highly preferred to use aqueous isopropanol and particularly 85% to 90% isopropanol.

In carrying out the extraction of the antioxidants from the oils with which they are associated, the oil to be treated is first mixed with the particular solvent to be employed. The relative proportion of oil to solvent may vary widely; the ratio of solvent to oil should be greater than one and preferably 2 to 50 parts of solvent to one part of oil. If desired, the solvent-oil mass may be warmed to a temperature slightly or substantially above room temperature. By so doing, it is sometimes possible to obtain somewhat more intimate contact of the solvent with the fatty material and thereby obtain a more efficient and complete extraction of the natural antioxidants. The solvent solution and the fatty material may then be separated from each other at the elevated temperature, or the mixture may first be allowed to cool to room temperature before completing this step of the process. The extraction is preferably carried out in an atmosphere of inert gas.

The antioxidant fraction extracted from the oil may be recovered in any suitable manner. As the solvent and the oil are immiscible at room or at temperatures substantially above room temperature, they may be separated by decantation, centrifugation, or any other suitable means. The oil will generally be found to be somewhat lighter in color than originally and in many cases will have lost some of its original characteristic odor. Furthermore, in most cases it will be found that materials responsible for producing "break" have been removed from the oil by the extraction. Thus the oil which has been extracted by the process of this invention may be used for a wide variety of purposes in accordance with processes well known to the art.

The solvent solution may be filtered and then treated to remove the solvent therefrom, e. g. by vacuum distillation, whereby an extract is recovered containing relatively large amounts of highly active antioxidants. If desired, water may be added to the extract in order to precipitate some of the glycerides contained therein or some of the sterols may be removed; however, these steps are not essential since the glycerides and sterols do not inhibit the antioxidant properties of the extract. If the extract contains an excessive amount of free fatty acids, these are preferably removed by treatment with alkali in a hydrocarbon or chlorinated hydrocarbon solvent medium or by other suitable methods. The extract ordinarily possesses the characteristic odor and color of the oil from which it is obtained and is generally slightly more viscous than the original oil. Tests carried out on vegetable oil extracts indicate that the iodine values of the extracts are substantially lower than those of the original oils. If a vitamin-containing fish liver oil is employed in the practice of the present invention, it will be found that the extract contains a considerable portion of the vitamins concentrated therein.

My novel antioxidants may be employed for the stabilization of all types of oxidizable organic substances, particularly those of a fatty nature, i. e. fatty oils, fats, waxes, soaps, vitamin concentrates, etc. Thus oils and fats of animal, vegetable or fish origin, such as cod liver oil, tuna liver oil, shark liver oil and other fish liver oils, as well as vitamin concentrates or vitamin-containing fractions obtained from such oils; corn oil, cotton seed oil, soybean oil and other vegetable oils; fats such as butter, margarine, lard, hydrogenated shortenings, palm oil, etc.; soaps of higher fatty acids; and compositions containing such fatty materials as essential ingredients, e. g. cookies, cakes, crackers, breakfast cereals, etc., as well as food emulsions such as mayonnaise, may all be suitably stabilized in accordance with this invention. Furthermore, substances such as sulfonated oils and other sulfonated fatty compounds, amides, mono and diglycerides and other fatty substances which tend to become rancid upon exposure to air may be treated by this invention. Other materials subject to oxidative changes which may be protected with the products of this invention include cosmetics, such as face creams, hand lotions, shaving creams, etc.; gasoline, mineral oil, lubricating oils, rubber, etc. The amount of the extract added to the fatty material to be stabilized may vary considerably, depending upon the activity of the extract and the degree of instability of the fatty material; I have found that oils or fats containing anywhere from about 0.1% to about 20%, preferably from about 0.5% to about 5%, of my antioxidant extracts show striking improvements in their stability.

My antioxidants are particularly adapted for the stabilization of fat-soluble vitamin-containing oils or concentrates, as well as vitamin-containing fractions recoverable from such products by vacuum distillation, solvent extraction or other processes. This is extremely fortunate, for antioxidants capable of stabilizing such products have not as yet been made available on a wide scale. My antioxidants may be added to such materials in any suitable amount without imparting undesirable color, odor, taste or toxicity thereto; furthermore, the incorporation of my antioxidants in such vitamin-containing products yields vitamin compositions of a stability such that they may be handled more easily and economically than compositions heretofore obtainable. These stabilized vitamin compositions may be employed in the same manner as ordinary vitamin compositions and thus may be incorporated in food materials of all types, emulsified to form valuable emulsions or put to other appropriate uses.

Substances of a fatty nature stabilized by the addition of my novel extracts thereto may be heated to elevated temperatures without substantially affecting the activity of the antioxidants; moreover, the heating of vitamin-containing oils stabilized by the addition of my extracts does not substantially reduce the vitamin activity of the oils. As a matter of fact, it was found that by adding the antioxidant extracts of the present invention to substances of a fatty nature having undesirable tastes and odors and subsequently heating the mixtures to elevated temperatures, e. g. 110° to 130° C., the undesirable tastes and odors of the substanes are substantially minimized.

A modification of the process hereinabove described which I have found to be particularly successful involves extracting a mixture of a fish liver oil and a vegetable oil containing natural antioxidants with one of the above solvents. As pointed out above the extraction of a fish liver oil effects a concentration of the vitamins contained therein in the solvent; furthermore, the antioxidants of the vegetable oil are also concentrated in the extract so that a highly potent, extremely stable extract is recovered. A similar extraction of a mixture of a vegetable oil and a fat-soluble vitamin concentrate yields an extremely stable extract constituted chiefly of the concentrate, and of the natural antioxidants and emulsifying agents of the vegetable oil. Furthermore, the vitamin concentrate which is recovered, particularly when the original concentrate is composed of the unsaponifiable fraction of a fish liver oil, is much improved in color, taste and odor over the original concentrate and also generally has a considerably higher potency than the original concentrate.

While the present invention is primarily concerned with the stabilization of oxidizable organic substances of a fatty nature, other oxidizable organic substances, such as non-fatty substances containing vitamin C, pyrethrum, essential oils, and other materials known to the art may be stabilized by treatment with my novel extracts.

The following example is illustrative of the method of producing the extracts of this invention; amounts are given in parts by weight.

*Example I*

200 parts of virgin wheat germ oil were mixed with 800 parts of 88% isopropanol and the mixture warmed to about 50° C. in the presence of $N_2$ gas and then thoroughly agitated for 10 minutes. After allowing the mixture to cool to room temperature, the clear supernatant solvent layer was decanted and the residual oil layer treated once more exactly as before with a fresh batch of isopropanol. The combined isopropanol extracts were then freed of solvent at a low tem-